(12) United States Patent
Kremeyer

(10) Patent No.: US 8,827,211 B2
(45) Date of Patent: Sep. 9, 2014

(54) LASER-BASED FLOW MODIFICATION TO REMOTELY CONTROL AIR VEHICLE FLIGHT PATH

(76) Inventor: Kevin Kremeyer, Tucson, AZ (US)

( * ) Notice: Subject to any disclaimer, the term of this patent is extended or adjusted under 35 U.S.C. 154(b) by 585 days.

(21) Appl. No.: 12/289,262

(22) Filed: Oct. 23, 2008

(65) Prior Publication Data

US 2009/0173836 A1    Jul. 9, 2009

Related U.S. Application Data

(60) Provisional application No. 60/960,976, filed on Oct. 23, 2007.

(51) Int. Cl.
*B64C 19/00* (2006.01)
*B64C 23/00* (2006.01)

(52) U.S. Cl.
USPC .................. 244/204; 244/201; 244/75.1

(58) Field of Classification Search
USPC ....... 244/205, 204, 204.1, 1 N, 1 R, 130, 198, 244/201, 203, 75.1
See application file for complete search history.

(56) References Cited

U.S. PATENT DOCUMENTS

| | | | |
|---|---|---|---|
| 3,719,829 A | 3/1973 | Vaill | |
| 5,263,661 A * | 11/1993 | Riley | 244/1 N |
| 5,797,563 A * | 8/1998 | Blackburn et al. | 244/130 |
| 6,247,671 B1 * | 6/2001 | Saeks et al. | 244/205 |
| 6,370,219 B1 | 4/2002 | Peale | |
| 6,401,589 B1 * | 6/2002 | Pinkus et al. | 89/1.1 |
| 6,527,221 B1 * | 3/2003 | Kremeyer | 244/1 N |
| 6,782,790 B2 * | 8/2004 | Barrett | 89/1.11 |
| 6,793,177 B2 * | 9/2004 | Bonutti | 244/78.1 |
| 6,824,108 B2 * | 11/2004 | Bonutti | 244/201 |
| 7,063,288 B1 * | 6/2006 | Kremeyer | 244/1 R |
| 7,121,511 B2 * | 10/2006 | Kremeyer | 244/130 |
| 7,641,153 B2 * | 1/2010 | Smereczniak | 244/205 |
| 7,648,100 B2 * | 1/2010 | Kremeyer | 244/1 R |
| 7,930,967 B2 * | 4/2011 | Marquis et al. | 89/36.17 |
| 2004/0084568 A1 * | 5/2004 | Bonutti | 244/204 |
| 2004/0084569 A1 * | 5/2004 | Bonutti | 244/204 |
| 2004/0118270 A1 * | 6/2004 | Barrett | 89/1.11 |
| 2005/0061908 A1 * | 3/2005 | Kremeyer | 244/1 N |
| 2005/0150371 A1 * | 7/2005 | Rickard | 89/1.11 |
| 2007/0040726 A1 * | 2/2007 | Kremeyer | 342/52 |
| 2007/0176046 A1 * | 8/2007 | Kremeyer | 244/1 N |
| 2009/0084252 A1 * | 4/2009 | Marquis et al. | 89/1.11 |
| 2009/0173837 A1 * | 7/2009 | Silkey et al. | 244/205 |
| 2011/0030379 A1 * | 2/2011 | Kremeyer | 60/768 |

FOREIGN PATENT DOCUMENTS

WO    WO 2006134050 A1 * 12/2006

OTHER PUBLICATIONS

Abbott, Ira H., Von Doenhoff, Albert E., and Stivers, Louis S., Jr., "Summary of Airfoil Data," NACA Rep., 824 (1945).
Lachowicz, J. M., Yao, C. S., and Wlezien, Richard W., "Flow field characterization of a jet and vortex actuator," *Experiments in Fluids*, vol. 27, Issue 1 (1999) 12-20.

(Continued)

*Primary Examiner* — Joseph W Sanderson
(74) *Attorney, Agent, or Firm* — Jones Day

(57) ABSTRACT

Systems, equipment, and methods to deposit energy to modify and control air flow, lift, and drag, in relation to air vehicles, and methods for seeding flow instabilities at the leading edges of control surfaces, primarily through shock-wave generation through deposition of laser energy at a distance.

12 Claims, 3 Drawing Sheets

(56) References Cited

OTHER PUBLICATIONS

Schewe, G., "Reynolds-number effects in flow around more-or-less bluff bodies," *Journal of Wind Engineering and Industrial Aerodynamics*, 89 (2001) 1267-1289.

Smetana, Frederick O., Summey, Delbert C., Smith, Neill S., and Carden, Ronald K., "Light Aircraft Lift, Drag, and Moment Prediction—A Review and Analysis," *NASA* CR-2523 (1975).

Wlezien, Richard W. and Ferraro, P. J., "Aeroacoustic Environment of an Advanced STOVL Aircraft in Hover," *AIAA J.*, 30:11 (1992) 2606-2612.

Wlezien, Richard W., Parekh, D. E., and Island, T., "Measurement of Acoustic Receptivity at Leading Edges and Porous Strips," *Applied Mechanics Reviews*, 43:5 Part 2 (1990) S167-S174.

* cited by examiner

LASER-BASED FLOW MODIFICATION TO REMOTELY CONTROL AIR VEHICLE FLIGHT PATH

CROSS REFERENCE TO RELATED APPLICATION

This application claims the benefit of priority from U.S. Provisional Patent Application No. 60/960,976, filed Oct. 23, 2007. The U.S. provisional application, in its entirety, is incorporated herein by reference.

The following patents and patent applications are each incorporated herein by reference in their entirety:
1) U.S. Pat. No. 6,527,221, which granted on Mar. 4, 2003, entitled "Shockwave Modification, Method and Apparatus and System;"
2) U.S. Pat. No. 7,063,288, which granted on Jun. 20, 2006, entitled "Shockwave Modification, Method and System;"
3) U.S. Pat. No. 7,121,511, which granted on Oct. 17, 2006, entitled "Shockwave Modification, Method and System;"
4) U.S. patent application Ser. No. 11/288,425 filed on Nov. 29, 2005 and entitled "Shockwave Modification, Method and System;"
5) U.S. patent application Ser. No. 11/540,964 filed on Oct. 2, 2006 and entitled "Shockwave Modification, Method and System;" and
6) International Patent Application No. PCT/US2008/009885 filed on Aug. 20, 2008 and entitled "Energy-Deposition Systems, Equipment and Methods for Modifying and Controlling Shock Waves and Supersonic Flow."

FIELD OF THE INVENTION

This invention relates to systems, equipment, and methods to deposit energy to remotely modify and control fluid flow along control surfaces of an air vehicle, in order to control its flight path and descent. The invention more specifically relates to lasers, acoustic excitation, and ablative shock waves, as well as non-lethal vehicle stopping.

BACKGROUND OF THE INVENTION

Air vehicle control is achieved through modifying flow across control surfaces, typically by adjusting flaps and angle of attack. Flow along the control surfaces can be modified in other ways to allow external control of the air vehicle. This can be achieved by generating excitations to seed instabilities that lead to transitions in the flow along the control surface, (such as boundary layer separation leading to decreased lift, stall, etc). Several publications discuss this (see below for a few), and one general term used to describe the phenomenon is "receptivity" of the specific driving frequency being picked up and amplified as it propagates along the control surface.

Abbott, Ira H.; Von Doenhoff, Albert E.; and Stivers, Louis S., Jr.: Summary of Airfoil Data. NACA Rep. 824 (1945).

Lachowicz, J. M., Yao, C. S., and Wlezien, Richard W.: Flow field characterization of a jet and vortex actuator, Experiments in Fluids, Volume 27, Issue 1, pp. 12-20 (1999).

Schewe, G., Reynolds-number effects in flow around more-or-less bluff bodies, Journal of Wind Engineering and Industrial Aerodynamics 89, 1267-1289 (2001).

Smetana, Frederick O.; Summey, Delbert C.; Smith, Neill S.; and Carden, Ronald K.: Light Aircraft Lift, Drag, and Moment Prediction—A Review and Analysis. NASA CR-2523 (1975).

Wlezien, Richard W. and Ferraro, P. J.: Aeroacoustic Environment of an Advanced STOVL Aircraft in Hover, AIAA J. Vol. 30 (11), pp. 2606-2612 (1992).

Wlezien, Richard W., Parekh, D. E., and Island, T.: Measurement of Acoustic Receptivity at Leading Edges and Porous Strips, Applied Mechanics Reviews, Vol. 43, 5, Part 2, pp. S167-S174 (1990).

The basic concept is that certain frequency excitations grow exponentially when seeded at the leading edge of a control surface, other frequencies die down and lead to stable flow. Seeding these frequencies, even very lightly, can lead to dramatic modification to the flow across the control surface, in particular, in loss of laminar flow, replaced by separated flow, leading to a strong reduction in lift, in fact leading to stall under the right conditions (or a dramatic loss in lift). The excitations we will provide are mediated/delivered via laser and much of the pertinent background is described in great detail in the Kremeyer patents included by reference. The laser-induced shockwaves we introduce, either on or near a surface, seed an extremely broad frequency range, encompassing the unstable (growing) frequencies, as well as stable (non-growing) frequencies. Even a very weak one-time introduction of an unstable frequency is expected to grow, as a result, introduction of the broad spectrum by the shockwaves at the leading edge is expected to seed all of the growing modes to disrupt flow. Performing this repeatedly/repetitively will ensure significant and lasting flow disruption on the targeted control surface.

BRIEF SUMMARY OF THE INVENTION

In one aspect, the present invention relates to systems, equipment, and methods to deposit energy to modify and control flow along the control surfaces of a remote air vehicle.

In another aspect, the systems, equipment, and methods can be used to control the flight path of an uncooperative air vehicle.

In another aspect, the systems, equipment, and methods can be used to ground an uncooperative air vehicle.

In another aspect, the systems, equipment, and methods can be based on and deployed from a chase plane.

In another aspect, the systems, equipment, and methods can be based on and deployed from a waterborne craft.

In another aspect, the systems, equipment, and methods can be based on and deployed from a land vehicle.

In another aspect, the systems, equipment, and methods can be based on and deployed from a fixed station.

In another aspect, the systems, equipment, and methods can be comprised of multiple laser systems, based on any combination of air vehicles, waterborne craft, land vehicles, and fixed stations, targeting any number of remote air vehicles.

In some embodiments, the energy deposition can take place in the form of repeated shockwaves generated by laser ablation on the leading edge of control and/or lifting surfaces such as wings, stabilizers, and rotors.

In some embodiments, the energy deposition can be delivered through repetition of a focused laser beam.

In some embodiments, the energy deposition can be delivered through repetition of a filamenting laser.

In some embodiments, the filamenting laser can deposit the energy directly onto the leading edge of the control surfaces via ablation.

In some embodiments, the filamenting laser can deposit the energy along the leading edge by forming the laser filament parallel to the control surface leading edge.

Several embodiments of the invention, including the above aspects of the invention, are described in further detail as follows, and in the inventions incorporated. Generally, each of these embodiments can be used in various and specific combinations, and with other aspects and embodiments unless otherwise stated herein.

DETAILED DESCRIPTION OF THE INVENTION

The following detailed description, and the accompanying drawings to which it refers, are provided describing and illustrating certain examples or specific embodiments of the invention only and not for the purpose of exhaustively describing all possible embodiments and examples of the invention. Thus, this detailed description does not in any way limit the scope of the inventions claimed in this patent application or in any patent(s) issuing from this or any related application.

To facilitate the understanding of the subject matter disclosed herein, a number of terms, abbreviations or other shorthand as used herein are defined below. These definitions are intended to complement the usage common to those skilled in the art. Any term, abbreviation or shorthand not defined is understood to have the ordinary meaning used by a skilled artisan contemporaneous with the submission of this application.

The term "air vehicle" is used herein to mean any manned or unmanned air vehicle or platform, such as any airplane, launch or re-entry vehicle, space-plane, missile, cruise missile, or the like.

Figure 1:
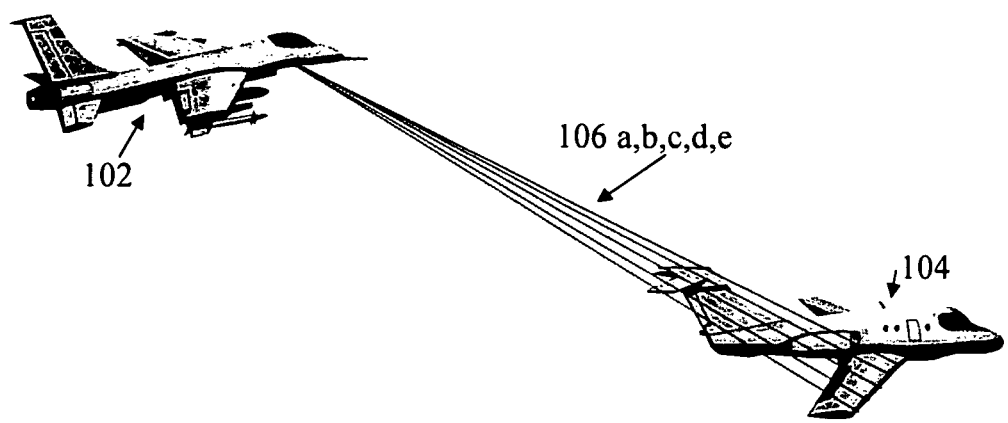
FIG. 1 shows a schematic of a pursuit plane employing the laser-based flow-modification technology to increase drag and reduce lift on one side of the fleeing air vehicle.

A laser-based approach is proposed modify this flow from a remote platform, such as a chase plane (FIG. 1). This approach will allow preferential modification of control forces to allow external control. This external control will allow steering forces and modified lift to be imposed, in order to steer and/or gradually and safely bring the targeted aircraft down. More dramatic control can be exerted if called for by initiating stall on the wings. This form of external control on the vehicle is safer and more compelling than the current options of electrically/mechanically disabling the vehicle or engaging in risky maneuvers that can endanger both the target and chase planes/occupants. Any damage to the target vehicle surface will be minimal. There is a market for this capability in government sectors, allowing smugglers and threats to be apprehended and/or deterred without risking loss of life. The proposed technology consists of rastering a pulsed laser at range along the leading edge of a control surface to preferentially increase or decrease the "lift" it generates. The drag on the control surface can also be preferentially increased. The final system will employ machine vision (FIG. 2) to track the control surface leading edges, ensuring sustained application of the externally-applied control throughout the course of the chase- and target-vehicle dynamics/maneuvers. The rotors of rotary aircraft can similarly be disrupted, in fact in certain embodiments, quite simply, by pulse-illuminating the entire rotor (in the case of a small stabilizing rotor), or a portion of a larger rotor, for example the large lifting rotor. This illumination can modify the flow along the rotary lifting and control surfaces in order to control both lift and rotary stabilization.

Vision: Current vehicle stopping technologies, including electromagnetic-and mechanical-incapacitation of a vehicle would prove very difficult to employ as a non-lethal weapon against airplanes in an interdiction scenario. In contrast, the proposed concept is applicable for use in interdiction missions and is envisioned to be employable and effective in chase-type scenarios where the targeted aircraft is fleeing from the chase plane. The cost of each use will come only from the electricity required to run the system (with the associated crew, fuel, and plane maintenance). The technology is further anticipated to operate at useful ranges, in excess of 500 m. The proposed technology development effort stands to yield a system to remotely control a fleeing vehicle by adjusting the lift and drag experienced by key control surfaces (control surfaces include both fixed and moving surfaces, generating lift, drag, and any other forces to enable flight and/or control). This will allow aircraft to be redirected, gently brought to a landing, or more quickly removed from the sky by suddenly initiating stall on the wings. Rotorcraft have similar considerations, dealing mainly with the upward and stabilizing tail force. The application of external force will be disruptive and confusing to the fleeing pilot, and control can be returned to the fleeing vehicle by simply disengaging the technology. In any number of chase scenarios, depending on the fleeing pilot's cooperativeness, full control can be returned to the pilot, moderate external control can be maintained, or the aircraft can be stalled if necessary. The approach does not necessarily have to be employed from above and/or behind the targeted vehicle. It can also be employed from below, from the side, or from in front of the fleeing vehicle, or from any position allowing a line-of-sight to the control/lifting surfaces to be affected. The technology also does not need to be housed on a manned chase-aircraft. It can be housed on an unmanned aircraft, a lighter-than-air platform, or a craft in space, or any other craft capable of housing it. The technology can further be housed on stationary structures or surface craft, such as land vehicles or waterborne craft, such as unmanned surface craft, unmanned underwater craft, boats, ships, or submarines. Similarly, a man-portable system can be envisioned.

Figure 4:
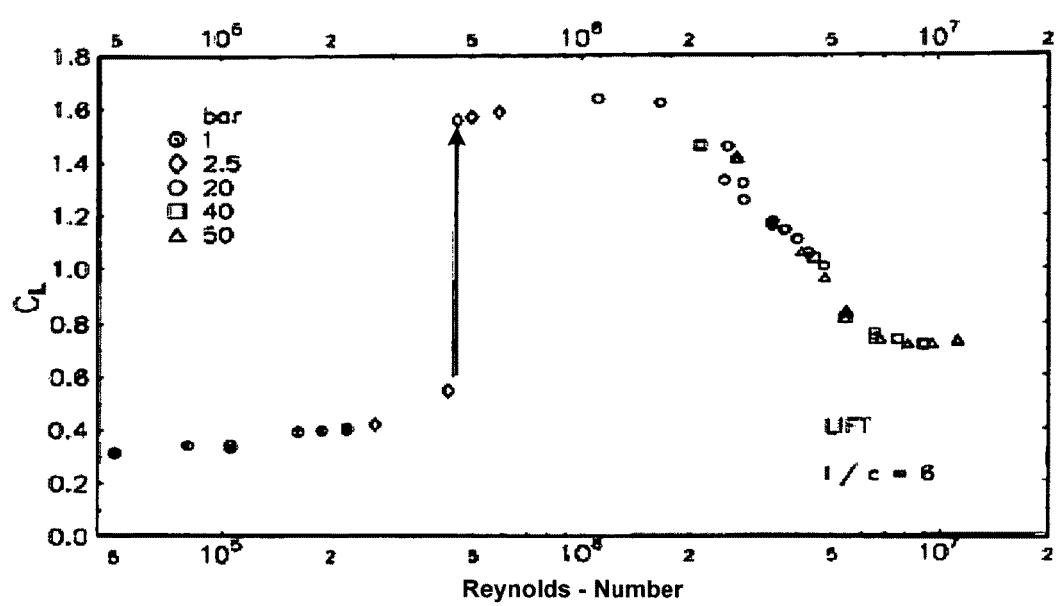
FIG. 4 shows a graph of Lift vs. Reynolds Number for the Growian-Profile at 12 deg AOA. A strong drop in lift results with transitions to/from laminar flow (Schewe).

Technical Rationale: The modification of aerodynamic flows through controlled disturbances has been studied in various forms for many years. The localized addition of thermal or acoustic energy can have a large effect on developing flowfields (e.g. as they propagate along the control surface after flowing across the leading edge). Even if only very small perturbations are seeded at the leading edge, if performed periodically, within the relatively broad band of unstable driving frequencies, these very small seed oscillations will grow as the flow propagates along the control surface to generate large-scale oscillations that determine the transition to turbulence and detached flow. This can strongly affect the performance of the control surface (FIG. 4). These studies have been pioneered by Tollmien, Schlichting, and Goertler. Our application calls for use of a pulsed laser to locally generate heating and expansion of the air at the surface of the air foil's leading edge, thereby providing a flow control perturbation capable of gross modification of airplane aerodynamics. Known flow modification schemes, which can be employed, include:

1) Active forcing of flow transition to turbulence near the leading edge of an airfoil to increase drag forces;
2) Active induction of crossflow vortices near an airfoil leading edge to increase drag;
3) Active flow separation control to locally alter airfoil lift; and
4) Active induction of airfoil separation to stall an airfoil on demand.

A primary benefit of the proposed laser-induced plasma approach is that it involves only directed energy and eliminates the need for anything but electrical power (e.g. no rounds, propellant, or other mechanical/chemical elements). Furthermore, propagation of the laser energy through the air is effectively instantaneous and relatively unaffected by the air/flow. This allows much greater precision/reliability in laser-targeting, than when using projectiles or other mechanical/chemical approaches. The adaptive optics methods required to operate over ranges, much greater than those proposed, are available, and strong shock generation/expansion and fluid flow due to laser ablation can be easily demonstrated over long ranges using pulsed lasers. Even weak laser ablation is capable of driving the required seed oscillations. In addition to delivering the ablating energy via focused or collimated laser pulses, with or without adaptive optics, self-focusing pulses can also be used to generate the ablation for the seed oscillations. The laser filaments that can result from these self-focusing lasers can yield ablating intensities over very long ranges. They can also provide weak seeding over the full length of a control surface's leading edge, such as that of a wing, by having the filament run roughly parallel to the leading edge and very near-by.

One potential defeat mechanism of longer (lower intensity) laser pulses is for the target aircraft to fly through clouds. This requires the presence of clouds and will impose its own limitations on the fleeing vehicle's capabilities. In addition to their ability to cause ablation at great ranges, the more exotic, self-focusing (filamenting, ultrashort) laser pulses can be investigated to penetrate fog/clouds, if these are of major concern in the mission space of interest. An unwarranted concern that may be raised is that of damage to the target surface. The small damage spots that will result at the target surface are anticipated to be no more than a few microns in depth, which falls well within the roughness tolerances listed in typical maintenance standards. Their effect will be small, if even noticeable, and the damage will be mitigated by the desorption of surface water at the point of laser ablation. Eye safety is also not a significant worry, since an eye-safe wavelength can be employed, and because the laser will target inert surfaces behind the cockpit (and will not target viewing ports). Eye-safe wavelengths are typically considered to be 1.5 to 1.55 microns and longer. When the laser pulse encounters the control surface and creates a plasma, a harmless flash of incoherent visible light will be generated at the point of illumination (FIG. 7). Finally, concerns may be raised regarding the ability of the laser to keep up with the leading edges of interest, as both the chase and target aircraft maneuver. The hardware and algorithms for this already exist, and since the time of laser propagation is effectively instantaneous, tracking is not anticipated to be problematic in the final application. Placing a reflective coating on the leading edge is not a viable mechanism of defeat, since the damage threshold can be exceeded of even the most reflective surfaces that can be practically incorporated onto a leading edge. Even if ideal coatings could be employed (which is riddled with practical impediments), the condensation of water vapor taking place at the leading edge will serve as the necessary ablatant for the laser pulses to fuel the seed disturbances.

EXAMPLES

The following examples are given as particular embodiments of the invention and to demonstrate the advantages thereof. It is understood that the examples are given by way of illustration and are not intended to limit the specification or the claims that follow in any manner.

As is illustrated in FIG. 1, a chase plane (102) targets an air vehicle (104) with laser pulses (106 a-e), rastered across the leading edge of a control surface.

Figure 2:
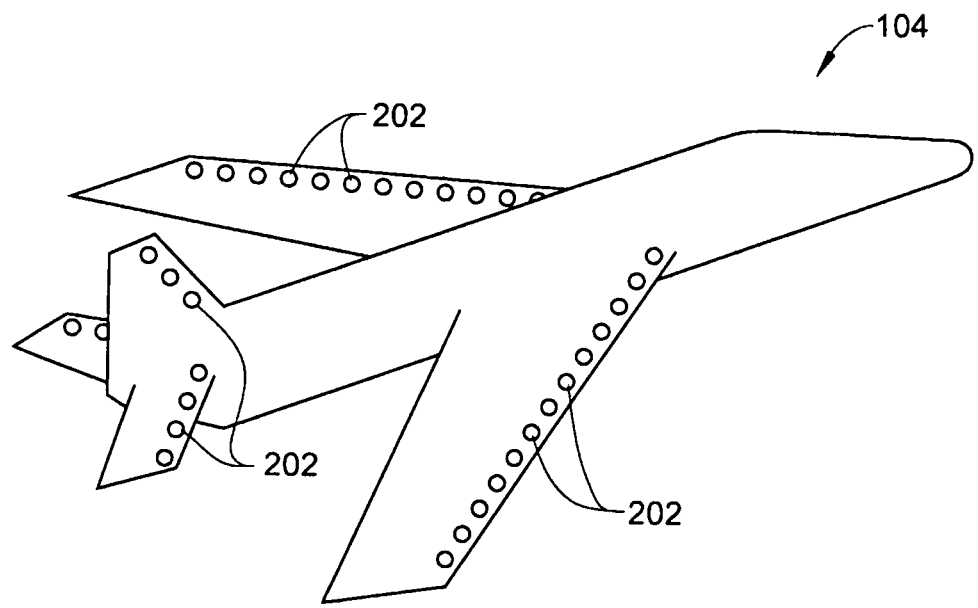
FIG. 2 shows a schematic of a machine-vision view of a target vehicle, allowing the leading edges to be identified and tracked during the ensuing target/chase-plane maneuvers.

As is illustrated in FIG. 2, the leading edge of any control surfaces (202), including lifting and stabilizing surfaces can be targeted with rastered laser ablation spots.

Figure 3:
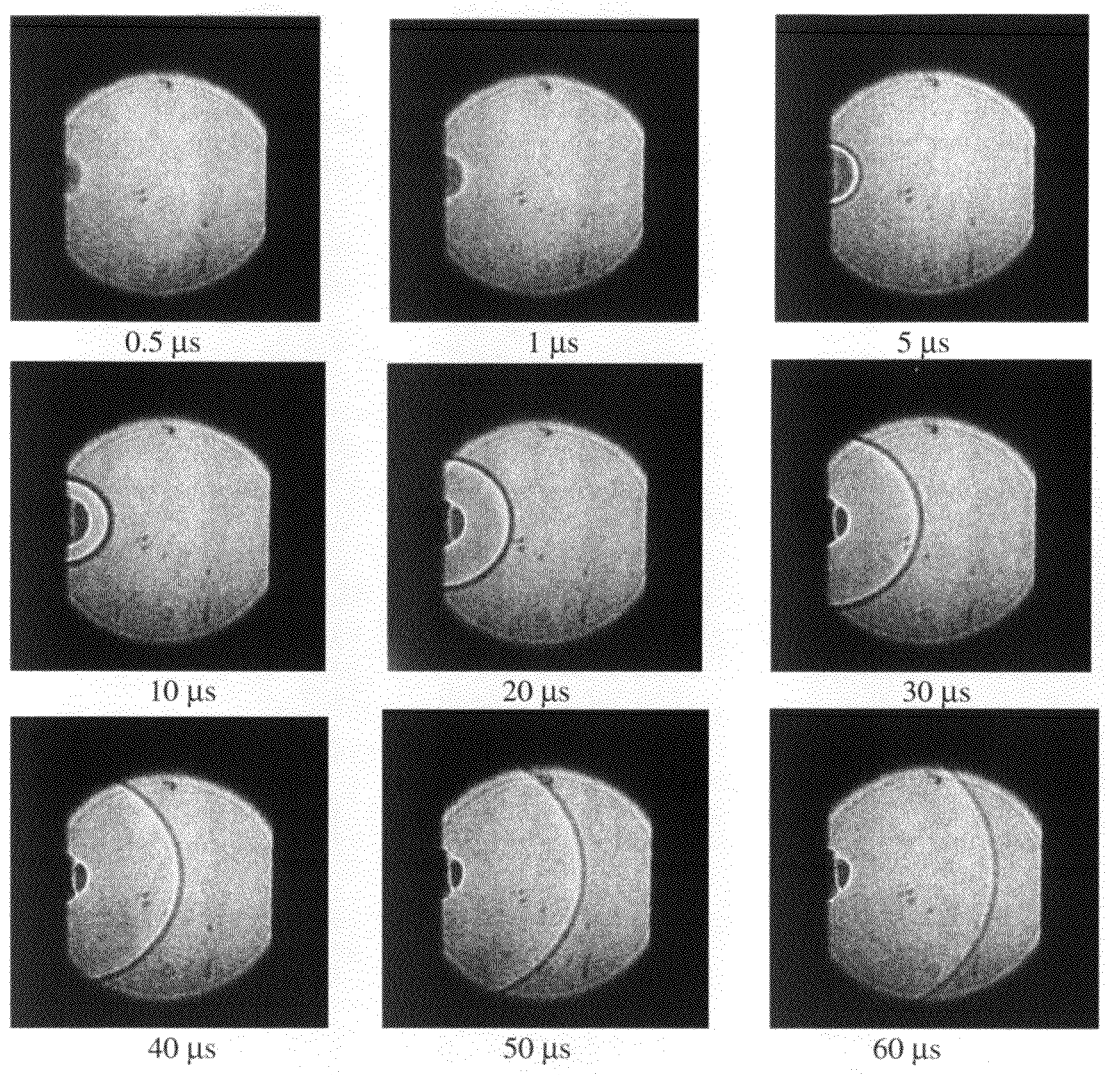
FIG. 3 shows a shadowgraph image of the expanding shockwave from a nanosecond laser energy deposited in atmosphere on an aluminum surface.

As is illustrated in FIG. 3, the laser ablation spots form when a surface (on left edge of each sub-figure shown at different times in the ablation evolution.). In this case, the energy deposition is on the order of hundreds of milliJoules, and the field of view is ~1.5", demonstrating a shockwave that expands over inches in tens of microseconds. As the shockwave passes over a given region, it excites a very broad range of frequencies (from a few Hz to tens of kHz) over a large area. This allows the maximum necessary repetition rate to be calculated roughly, based on simply the size over which the shock passes. For the case of several inches of influence for each energy deposition spot and many feet of leading edge, the laser will need to deposit tens of laser spots to cover the leading edge once, and it will need to refresh this line of energy deposition to keep the instability seeded and continually excited. If it requires some time for the instability to die down, we can estimate roughly one excitation for every few inches to every foot traveled by the targeted air vehicle, resulting in the leading edge having to be rastered across the full length at a rate of hundreds of Hz. This yields the need for laser pulse repetition rates of thousands of Hz. Depending on the energy required per pulse, the necessary average power of the laser can range from tens to hundreds of Watts. For the alternate geometry, in which the extended linear (cylindrical) shock wave of a laser filament is directed nearby and roughly parallel to the targeted leading edge, similar power requirements can be estimated. Assuming a refresh requirement along the leading edge for every cm of travel, we can approximate a laser repetition rate of tens of kHz, with several mJ of energy required to sustain the filament during each shot, this yields an average power of 10's to 100's of Watts.

As is illustrated in FIG. 4, one of the effects that can be sought in the described control is a significant drop in lift associated with flow separation that can be controlled through seeding of the correct instabilities (which are included in the very broad range of frequencies represented in the shockwave generated by either laser ablation at a point or by a filament in the air). Asymmetrically imposing the dramatic drop in lift shown in FIG. 4 will provide the ability to turn the targeted air vehicle and/or eliminate its yaw stability, among other possible control schemes. Targeting the tail rotor of a helicopter will also cause the targeted air vehicle to rotate. Symmetrically targeting the wings of a fixed wing aircraft will cause the targeted air vehicle to quickly ground itself, while targeting the main rotor of a rotor craft will also cause it to lose lift. All of the power estimates made for the instances of targeting large, possibly manned, aircraft are strongly reduced when considering targeting some of the smaller and slower unmanned aircraft. In these cases, the wing-span can be less by a factor of 5 to 100, and the speeds can be slower by a factor of 2 to 100. This immediately reduces the operationally required average power estimate for a system to counter/control unmanned air vehicles by a factor of 10 and possibly much more, based on how small and slow the targeted unmanned vehicles are. This places the various ranges of average power requirements at 1-10 kW if wanting to ensure a fully powered system, 100-1000 W for a system sufficient for most needs, and then laser systems of 1-1000 W average power for targeting smaller aircraft such as small unmanned air vehicles.

What is claimed is:

1. An energy deposition system, comprising:
   one or more 100 to 1000 watt, average power, pulsed laser sources mounted on a chase vehicle;
   a sub-assembly for tracking a leading edge of at least one or more control surfaces of an uncooperative air vehicle; and
   control hardware in communication with the tracking sub-assembly and in control of the one or more pulsed laser sources;
   wherein, in response to the tracking, the control hardware processes a control algorithm for controlling the one or more pulsed laser sources to remotely deposit laser energy to generate laser-induced plasma on the leading edge of the at least one or more control surfaces of the uncooperative vehicle.

2. The system of claim 1, wherein the control hardware controls the one or more pulsed laser sources to deliver at least one laser-induced plasma excitation per every inch to foot of travel by the uncooperative air vehicle, resulting in the leading edge of the at least one or more control surfaces of the uncooperative air vehicle being rastered across its full length by the one or more pulsed laser sources at a rate of more than 100 Hertz.

3. The system of claim 1, wherein the system is located on a chase plane.

4. The system of claim 1, wherein the system is located on one or more waterborne craft.

5. The system of claim 1, wherein the system is located on some combination of one or more air vehicles, land vehicles, waterborne craft, and fixed stations.

6. The system of claim 1, wherein the control hardware controls the one or more pulsed laser sources to steer the uncooperative air vehicle.

7. The system of claim 6, wherein the system is located on a chase plane.

8. The system of claim 6, wherein the system is located on one or more waterborne craft.

9. The system of claim 1, wherein the control hardware is programmed to control the placement and timing of the one or more pulsed laser sources.

10. The system of claim 9, wherein the control hardware controls the one or more pulsed laser sources to steer the uncooperative air vehicle.

11. The system of claim 10, wherein the system is located on a chase plane.

12. The system of claim 10, wherein the system is located on one or more waterborne craft.

* * * * *